(12) United States Patent
Durand et al.

(10) Patent No.: US 12,497,155 B2
(45) Date of Patent: Dec. 16, 2025

(54) AIRCRAFT PART HAVING A FLOOR JOINED TO A FUSELAGE PORTION VIA ELASTIC LINK RODS

(71) Applicant: Airbus Operations SAS, Toulouse (FR)

(72) Inventors: Jérôme Durand, Toulouse (FR); Benoit Orteu, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/081,153

(22) Filed: Dec. 14, 2022

(65) Prior Publication Data

US 2023/0192268 A1 Jun. 22, 2023

(30) Foreign Application Priority Data

Dec. 16, 2021 (FR) ...................... 2113621

(51) Int. Cl.
*B64C 1/18* (2006.01)
(52) U.S. Cl.
CPC ...................... *B64C 1/18* (2013.01)
(58) Field of Classification Search
CPC ................... B64C 1/18; B64C 1/20
See application file for complete search history.

(56) References Cited

U.S. PATENT DOCUMENTS

| | | | | |
|---|---|---|---|---|
| 7,967,251 B2 * | 6/2011 | Wood | | B64C 1/18 244/131 |
| 8,523,109 B2 * | 9/2013 | Demont | | B64C 1/18 244/119 |
| 2010/0213315 A1 * | 8/2010 | Marpinard | | B64C 1/18 244/119 |
| 2011/0011978 A1 * | 1/2011 | Haack | | B64C 1/18 244/119 |
| 2011/0011987 A1 | 1/2011 | Lessard | | |
| 2012/0061513 A1 | 3/2012 | Gallant et al. | | |

(Continued)

FOREIGN PATENT DOCUMENTS

| | | | |
|---|---|---|---|
| EP | 3480110 A1 * | 5/2019 | |
| WO | WO-2007033640 A1 * | 3/2007 | B64C 1/18 |

OTHER PUBLICATIONS

French Search Report dated Jul. 8, 2022; priority document.

*Primary Examiner* — Joshua J Michener
*Assistant Examiner* — Ryan Andrew Yankey
(74) *Attorney, Agent, or Firm* — Greer, Burns & Crain, Ltd.

(57) ABSTRACT

An aircraft part has a fuselage portion and a floor, at least a part of which is joined to the fuselage portion via elastic link rods. Each elastic link rod is provided with a first end that is configured to be fixed to the floor and with a second end that is configured to be fixed to the fuselage portion. The elastic link rods are configured to exhibit a stiffness that makes it possible both to transmit loads between the floor and the fuselage portion and to absorb displacements brought about by deformations of the fuselage portion. The aircraft part thus making it possible, at a lower cost and with a lower mass, to obtain a connection between the floor and the fuselage portion that exhibits suitable elasticity to be able to transmit inertial loads while absorbing deformations of the fuselage portion.

17 Claims, 4 Drawing Sheets

(56) References Cited

U.S. PATENT DOCUMENTS

2015/0344120 A1\* 12/2015 Dazet .................... F16G 11/12
                                                                     244/119
2017/0106966 A1\* 4/2017 Himmelmann ........... B64C 1/22
2018/0163773 A1\* 6/2018 Depeige ................. B64C 13/30

\* cited by examiner

AIRCRAFT PART HAVING A FLOOR JOINED TO A FUSELAGE PORTION VIA ELASTIC LINK RODS

CROSS-REFERENCES TO RELATED APPLICATIONS

This application claims the benefit of the French patent application No. 2113621 filed on Dec. 16, 2021, the entire disclosures of which are incorporated herein by way of reference.

FIELD OF THE INVENTION

The present invention relates to an aircraft part having a floor joined to a fuselage portion via elastic link rods.

BACKGROUND OF THE INVENTION

The fuselage of an aircraft is a structure which is subject to loads and high stresses which may, for example, be caused by external mechanical stresses, the weight of the aircraft or the angle of the control surfaces. These stresses bring about deformations of the fuselage, in particular in the vicinity of the landing gear and of the central wing box of the aircraft. On account of such deformations, it is not desirable to provide a rigid continuous floor which is fixed on each side to the fuselage. This is because such a structure would exhibit significant deformation incompatibility, meaning that the deformations of the fuselage would bring about excessive stresses in the floor and in the fuselage.

One solution for remedying this problem consists in providing, at several locations along the aircraft, in particular at the locations at which the deformation is greatest, a floor comprising crossmembers that are not continuous, so as to allow the floor not to be coupled to the deformation of the fuselage. However, this solution is not entirely satisfactory, in particular in freight transport airplanes, or cargo airplanes. This is because, in a cargo airplane, containers are generally held on the floor by hooks or locks that are fixed to the latter. Also, if the floor comprises non-continuous crossmembers intended to absorb the deformations of the fuselage, parts of the floor may move apart from one another, and so the hooks or locks may no longer hold the containers.

One solution for remedying this problem is to add a robust intermediate structure between the fuselage and the floor, which is able to withstand the mechanical stresses brought about by the deformations of the fuselage without transmitting deformations to the floor. However, such a structure exhibits a large mass and a high cost.

Therefore, these conventional solutions are not entirely satisfactory.

SUMMARY OF THE INVENTION

The present invention relates to an aircraft part comprising at least one fuselage portion and a floor joined to the fuselage portion, which has an object of remedying the abovementioned drawbacks.

According to the invention, at least a part of the floor is joined to the fuselage portion via elastic link rods, each elastic link rod being provided with a first end that is able to be fixed to the floor and with a second end that is able to be fixed to the fuselage portion, the elastic link rods being configured so as to exhibit a stiffness that makes it possible both to transmit loads between the floor and the fuselage portion and to absorb displacements brought about by deformations of the fuselage portion.

Thus, the invention provides, at a lower cost and with a lower mass, an aircraft part in which the connection between the floor and the fuselage portion, formed by elastic link rods that join a part of the floor to the fuselage portion, exhibits suitable elasticity able to transmit loads while absorbing deformations of the fuselage portion, as specified above.

In one preferred embodiment, the floor comprises crossmembers and at least some of the crossmembers are joined to the fuselage portion, for each crossmember via at least one elastic link rod. In addition, preferably, at least some of the crossmembers are joined on each side to the fuselage portion via elastic link rods.

Advantageously, at least one of the elastic link rods, is joined to the fuselage portion at a rigid point of the fuselage portion. Preferably, the rigid point is positioned at the level of the floor or below the level of the floor.

In a first embodiment, at least one of the elastic link rods is arranged such that its first end, which is joined to the floor, is situated towards the inside and towards the top of the aircraft part compared with its second end, which is joined to the fuselage portion.

Moreover, in a second embodiment, at least one of the elastic link rods is arranged such that its first end, which is joined to the floor, is situated towards the outside and towards the top of the aircraft part compared with its second end, which is joined to the fuselage portion.

Furthermore, in one particular embodiment, at least one of the elastic link rods corresponds to one of the following link rods: an elliptical-spring rod, a spring-washer rod, a piston rod.

Moreover, advantageously, the aircraft part has at least one damper coupled to at least one of the elastic link rods.

Furthermore, advantageously, the aircraft part has at least one damping system associated with at least one of the elastic link rods.

The present invention also relates to an aircraft, in particular a cargo airplane, having an aircraft part as described above.

BRIEF DESCRIPTION OF THE DRAWINGS

The appended figures will make it easy to understand how the invention may be implemented. In these figures, identical references denote similar elements.

DETAILED DESCRIPTION OF THE PREFERRED EMBODIMENTS

Figure 4:
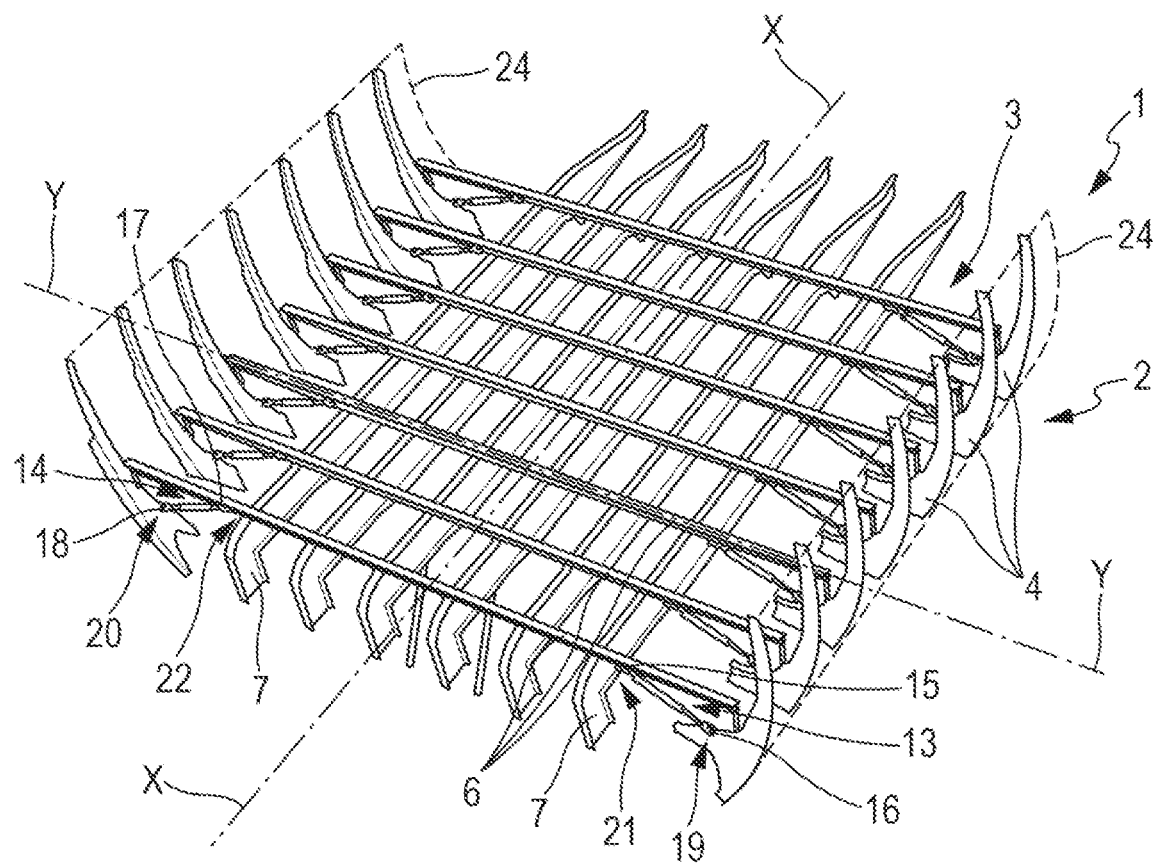
FIG. 4 is a partial, perspective view of the aircraft part according to the first embodiment, showing a plurality of crossmembers of the floor.
Figure 5:
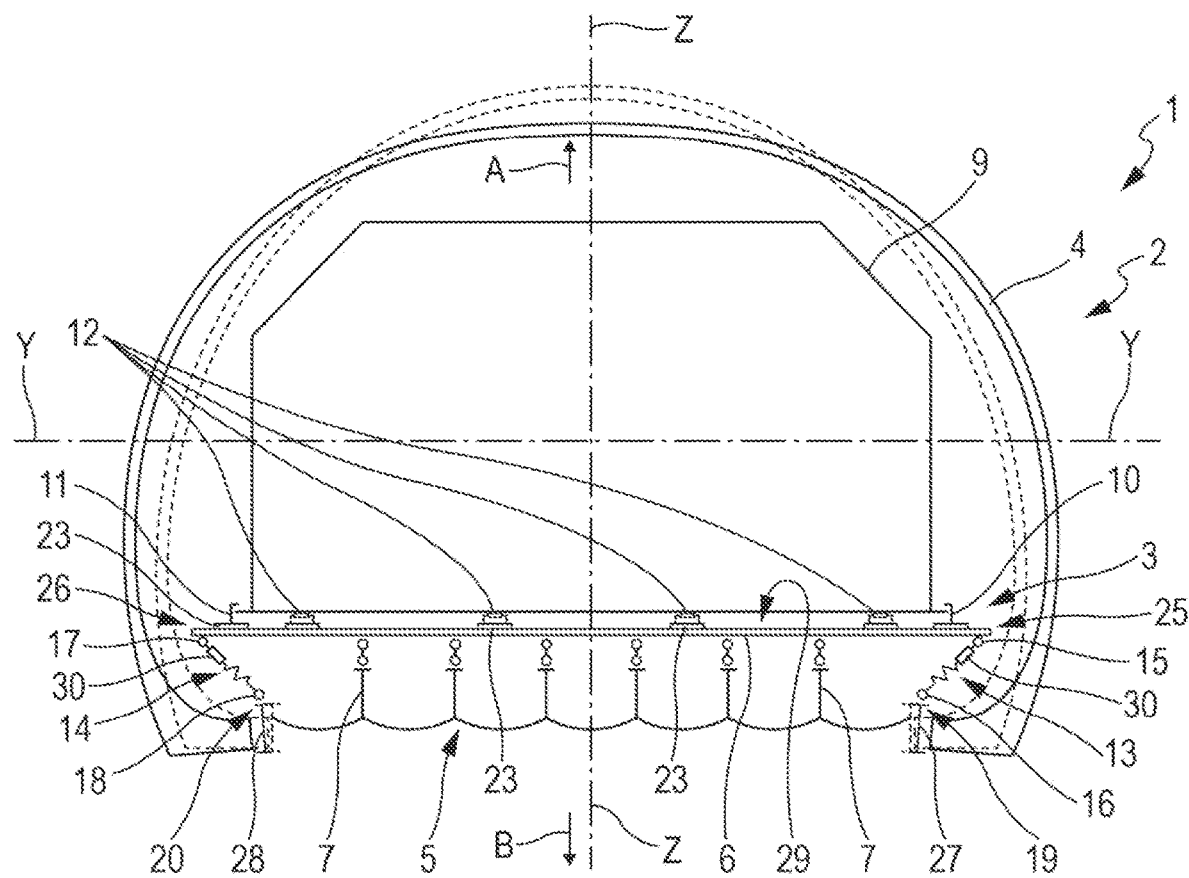
FIG. 5 is a schematic view, in cross section, of a second embodiment of an aircraft part having a floor joined to a fuselage portion by elastic link rods, the schematic view showing the deformed fuselage portion by way of solid lines and the non-deformed fuselage portion by way of dashed lines.
Figure 6:
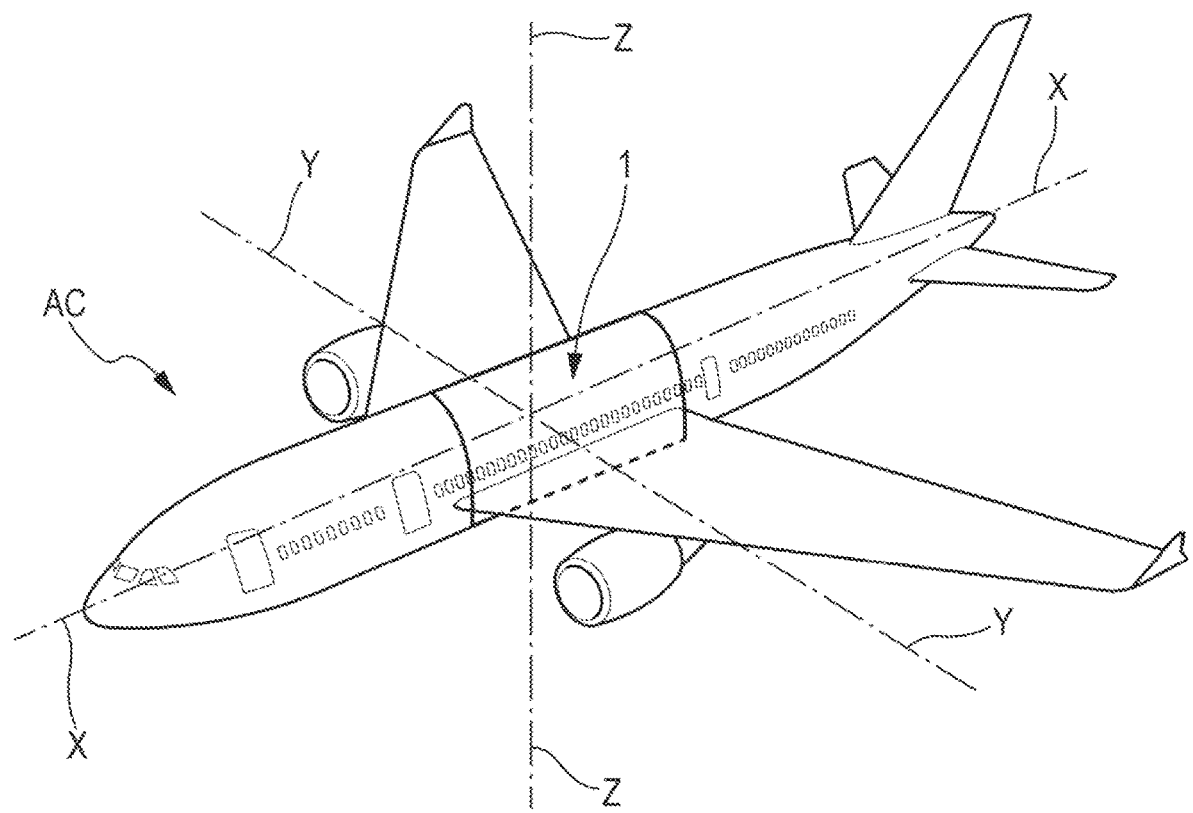
FIG. 6 is a schematic, perspective view of an aircraft comprising an aircraft part according to one particular embodiment.

The aircraft part 1 that is shown schematically in particular embodiments in FIG. 1 to FIG. 6 and illustrates the invention is a part (or portion) of an aircraft AC (FIG. 6).

In the scope of the present invention, an "aircraft part" is understood to be a portion of the airframe of the aircraft AC along the longitudinal direction of the aircraft AC, which has at least one fuselage portion and a segment of the floor of the aircraft AC. Although not exclusively, the aircraft part 1 is particularly appropriate for an aircraft corresponding to a cargo airplane, that is to say, an airplane intended to transport freight, for example in the form of containers.

The aircraft part 1 shown in FIGS. 1 to 5 comprises a fuselage portion 2 and a floor 3 joined to the fuselage portion 2. The aircraft part 1 has a longitudinal axis X-X (shown in FIGS. 4 and 6) corresponding to the longitudinal axis of the aircraft AC of which it is intended to be part. It also has a vertical axis Z-Z forming, with the longitudinal axis X-X, a vertical plane of symmetry of the aircraft AC, and a transverse axis Y-Y orthogonal both to the longitudinal axis X-X and to the vertical axis Z-Z. These axes thus form an orthogonal frame of reference.

In the remainder of the description, the following terms are defined as follows:
- the term "upper" or "top" relates to an element which is situated along the direction of the vertical axis Z-Z in the direction of an arrow A depicted, in particular, in FIG. 1 and FIG. 5;
- the term "lower" relates to an element which is situated along the direction of the vertical axis Z-Z in the direction of an arrow B (opposite to the arrow A) depicted in particular in FIG. 1 and FIG. 5;
- the term "transverse" relates to an element which is situated along the direction of the transverse axis Y-Y;
- the term "inner" relates to an element which extends towards, or is oriented towards, the longitudinal axis X-X; and
- the term "outer" or "external" relates to an element which extends away from, or is oriented in the direction away from, the longitudinal axis X-X.

Figure 3:
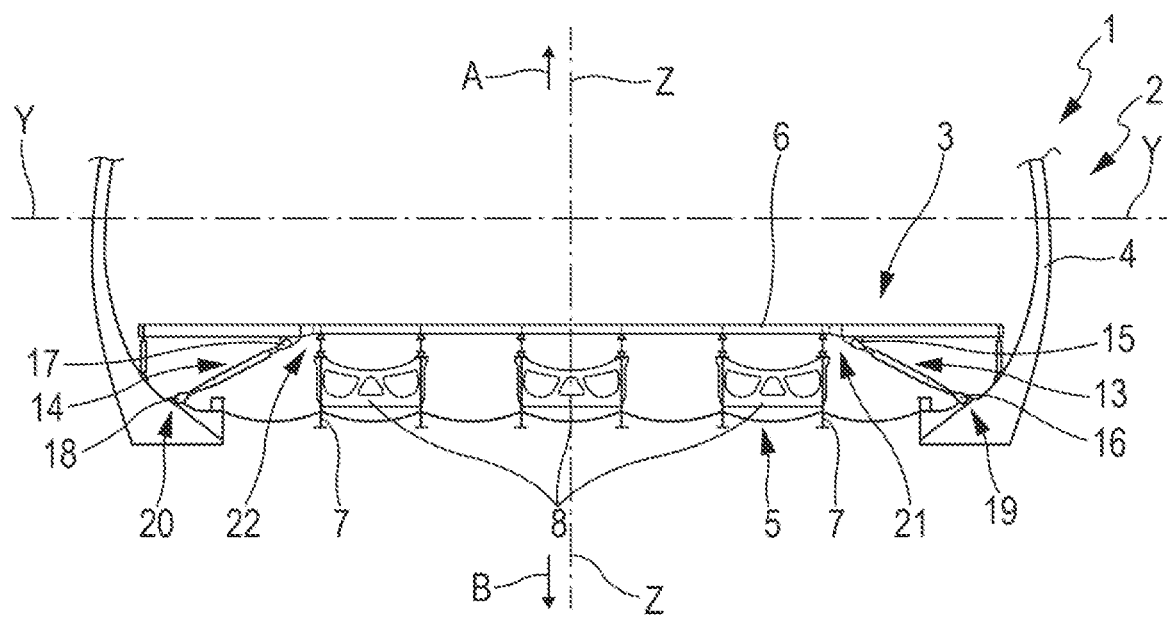
FIG. 3 is a partial view, in cross section, of the aircraft part according to the first embodiment, in which the floor is supported on portal frames, some of which are joined together by connecting webs.

The fuselage portion 2 has frames 4 on which panels 24 (shown, partially, very schematically and by way of dashed lines in FIG. 4) which are intended to be arranged so as to form a skin for the fuselage of the aircraft AC. In a preferred embodiment, shown in more detail in FIG. 3 and FIG. 4, the frames 4 are arranged symmetrically on either side of the longitudinal axis X-X and they are spaced apart longitudinally and regularly from one another. The frames 4 correspond to circular arcs such that the fuselage portion 2 has a substantially cylindrical shape having the longitudinal axis X-X as its central axis.

Furthermore, in one particular embodiment, the aircraft part 1 comprises, towards the bottom, a wall 5, as shown in FIG. 1, FIG. 2, FIG. 3 and FIG. 5. This wall 5 may, in particular, correspond to a roof of conventional landing gear or to an upper skin panel of a conventional central wing box.

The floor 3 corresponds to a conventional aircraft floor. It may be a complete floor or a floor segment intended, for example, to be joined to one or more other floor segments so as to form a complete floor. The floor 3 is arranged inside the fuselage portion 2, that is to say, in the space delimited by the cylinder formed by the fuselage portion 2. In addition, the floor 3 has crossmembers 6 which are supported on spars (or beams or portal frames) 7, as shown in FIG. 1 to FIG. 5. The crossmembers 6 correspond to continuous (or non-continuous) beam members, and they are arranged parallel to the transverse axis Y-Y, from one side of the fuselage portion 2 to the other. For their part, the spars 7 correspond to beam elements that are arranged parallel to the longitudinal axis X-X.

Furthermore, as shown in FIG. 3, the aircraft part 1 may also have connecting webs 8. The connecting webs 8 correspond to structural elements that are, for example, part of the landing gear or of the central wing box. They may make it possible, in particular, to transversely connect the different spars 7 together.

The spars 7 and the connecting webs 8 may in particular be made of metal material, for example of aluminum. These elements are connected together. They may, for example, be fixed together via conventional mechanical connecting elements or by welding.

Figure 1:
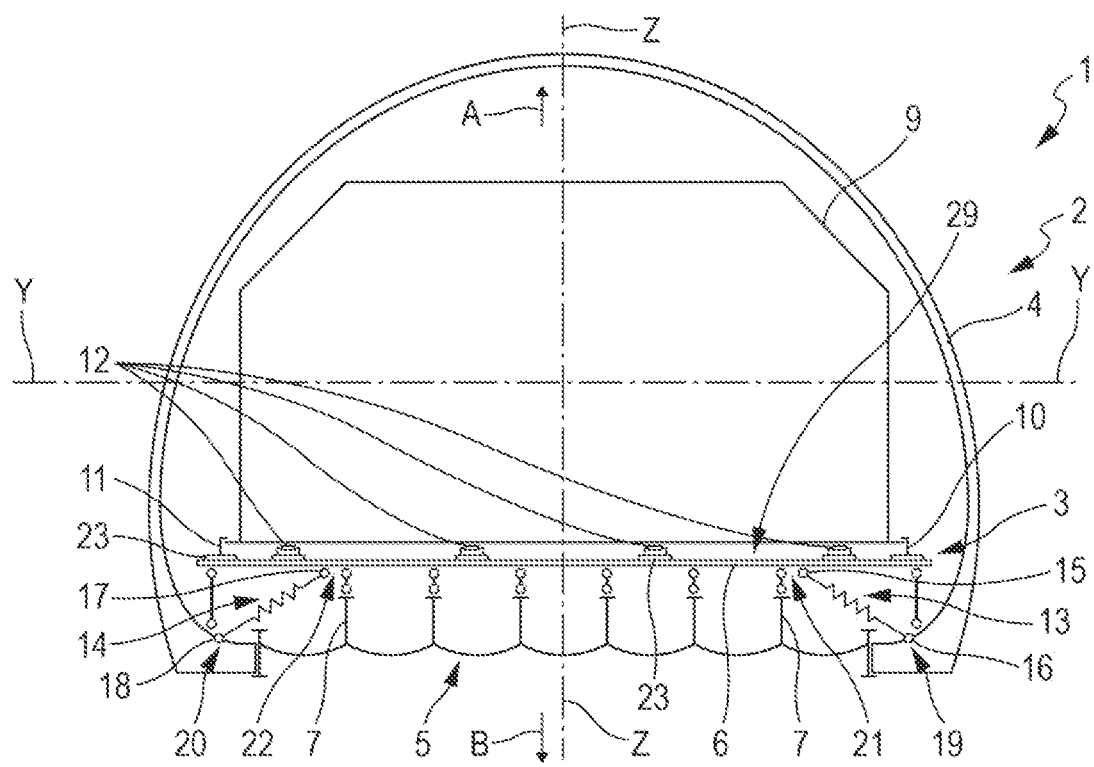
FIG. 1 is a schematic view, in cross section, of a first embodiment of an aircraft part having a floor joined to a fuselage portion by elastic link rods.
Figure 2:
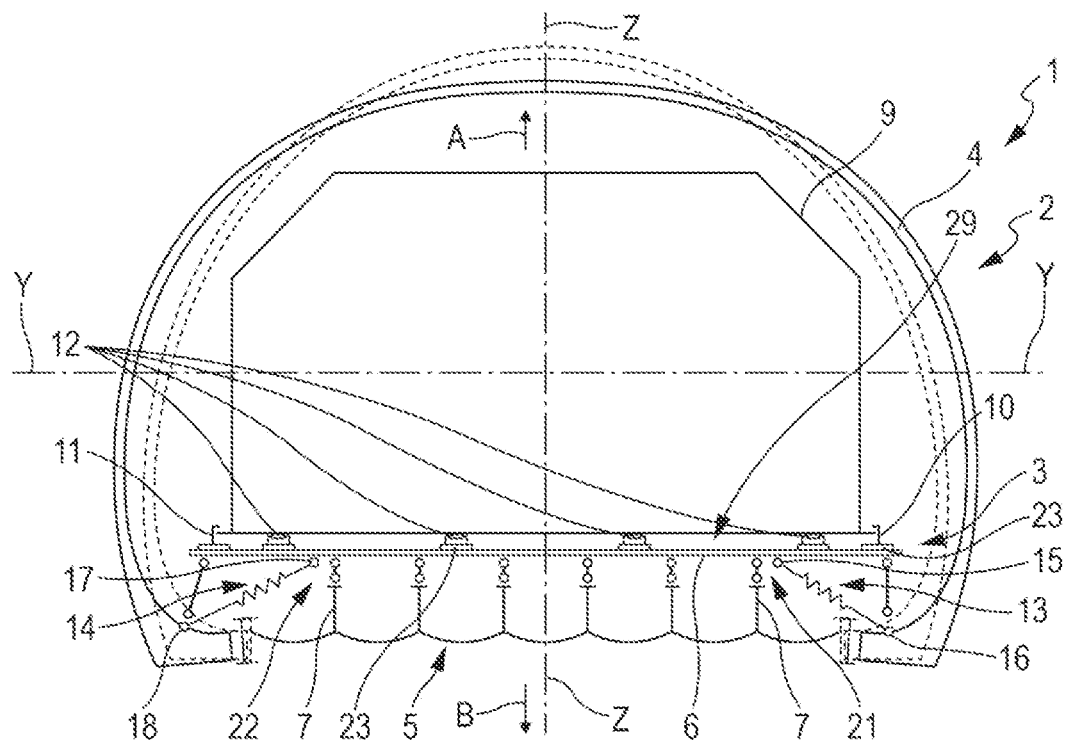
FIG. 2 is a schematic view, in cross section, of the aircraft part according to the first embodiment, in which the fuselage portion depicted by solid lines is subjected to a particular deformation, the schematic view also showing the non-deformed fuselage portion by way of dashed lines.

Furthermore, in the embodiments shown schematically in FIG. 1, FIG. 2 and FIG. 5, the floor 3 has (longitudinal) rails 23 equipped with locks (or hooks) 10 and 11 and (longitudinal) rails 23 equipped with supports 12 (generally rollers). The locks (or hooks) 10 and 11 and the supports 12 are intended to hold a cargo 9, for example a container. The locks (or hooks) 10 and 11 and the supports 12, of conventional types, are arranged on an upper face 29 of the floor 3. The rails 23 equipped with locks (or hooks) 10 and 11 are fixed to crossmembers 6 of the floor 3 at their transverse ends. They are configured to hold the cargo 9 in place at least transversely, namely along the transverse axis Y-Y. The locks (or hooks) 10 and 11 and the crossmembers 6 are rigid and non-deformable, in particular transversely. The cargo 9 therefore cannot come loose, for example under the effect of inertial loads.

In addition, the supports 12 are distributed regularly over at least a part of the upper surface 29 of the floor 3 in order to support the cargo 9 uniformly.

Furthermore, in the scope of the present invention, at least some of the crossmembers 6 of the floor 3 are joined to the fuselage portion 2 via elastic link rods 13 and 14. An "elastic link rod" is understood to be a component provided with articulations at its ends, of adjustable or non-adjustable length, having sufficiently elastic behavior (low modulus and high elongation) so as to transmit loads while allowing a certain deformation of the elastic element depending on its stiffness, as specified above.

The aircraft part 1 comprises a plurality of elastic link rods 13 and 14 in the longitudinal direction X (FIG. 4), only two of which are visible in the transverse views in FIG. 1, FIG. 2, FIG. 3 and FIG. 5. Each of the elastic link rods 13 and 14 is provided with a first end 15, 17 joined to the floor 3 and with a second end 16, 18 joined to the fuselage portion 2. More specifically, the end 15 of the elastic link rod 13 is fixed to one of the crossmembers 6 of the floor 3 and the end 16 of the elastic link rod 13 is fixed to one of the frames 4 of the fuselage portion 2 Similarly, the end 17 of the elastic link rod 14 is fixed to the crossmember 6 of the floor 3 and the end 18 of the elastic link rod 14 is fixed to one of the frames 4 of the fuselage portion 2.

The elastic link rods 13 and 14 are link rods with calibrated stiffness. More particularly, the elastic link rods 13 and 14 are configured to exhibit a stiffness that makes it possible both to transmit transverse inertial loads between the floor 3 and the fuselage portion 2 and to absorb movements brought about by deformations of the fuselage portion 2.

Thus, when the fuselage portion 2 deforms, this deformation is absorbed by the elastic link rods 13 and 14, thereby limiting the stresses to which the floor 3 and the fuselage portion 2 are subjected. The aircraft part 1 therefore has a floor 3 which is rigid and makes it possible hold the cargo 9 securely in place, and which does not create an incompatibility of deformation with the fuselage portion 2.

Furthermore, the elastic link rods 13 and 14 are sufficiently rigid to transmit loads to the fuselage portion 2, in particular inertial loads transmitted from the cargo 9 to the floor 3 and then to the fuselage portion 2. The elastic link rods 13 and 14 therefore also make it possible to keep the floor 3 and the cargo 9 substantially centered within the fuselage portion 2.

In one preferred embodiment, the elastic link rods 13 and 14 are configured to exhibit a fixed stiffness and a sufficient travel, which are adapted to the floor 3 and to the cargo 9 to be supported. For example, depending, in particular, on the maximum known deformations of the fuselage portion 2 and on the mass of the cargo 9 (making it possible to determine the inertial loads), it is possible to define a stiffness and a travel of the elastic link rods 13 and 14 that are adequate for obtaining a desired maximum displacement of the floor 3.

The arrangement of these elastic link rods 13 and 14 thus makes it possible, at a lower cost and with a lower mass, to ensure the transverse (or lateral) connection between the floor 3 having continuous crossmembers 6 and the fuselage portion 2, in particular in zones of the aircraft AC in which the deformation of the fuselage is greatest. It makes it possible, in particular, to avoid the addition of a rigid structure (such as a longitudinal box) intended to keep the floor in the transverse direction.

In one particular embodiment, the elastic link rods 13 and 14 may correspond to adjustable elastic link rods, namely link rods of which the stiffness and travel may be adjusted to desired values. Thus, the aircraft part 1 may be designed to transport varied cargo, in particular with different masses.

Furthermore, in one particular embodiment, the elastic link rods 13 and 14 are joined to the fuselage portion 2 at points of the fuselage portion 2 that are referred to as "rigid" points. In particular, the end 16 of the elastic link rod 13 is fixed to the fuselage portion 2 at a rigid point 19. Similarly, the end 18 of the elastic link rod 14 is fixed to the fuselage portion 2 at a rigid point 20. The rigid points 19 and 20 correspond to attachment points situated in zones of the fuselage portion 2 that are less deformable than the rest of the zones in question.

Preferably, the rigid points 19 and 20 are positioned in zones of the fuselage portion 2 that are situated below the level of the floor 3 (in the direction Z), namely on the side of the floor 3 that is oriented towards the bottom of the aircraft part 1. Specifically, these zones of the fuselage portion 2 are subject to less in the way of deformations, as illustrated in FIG. 2 and FIG. 5, in which the fuselage portion 2 is subjected to particular deformations. In FIG. 2 and FIG. 5, the fuselage portion 2 is shown in two different embodiments. The solid-line outline shows the deformed fuselage portion 2, and the dashed-line outline shows the non-deformed fuselage portion 2. Consequently, the rigid points 19 and 20 are situated in zones which exhibit a minimum of displacement during the deformation of the fuselage portion 2.

In the embodiment shown in FIG. 1, the rigid points 19 and 20 are positioned on the frames 4. However, the rigid points 19 and 20 may be positioned on other elements of the fuselage portion 2, for example on lateral ends of the wall 5, and, as specified below with reference to the embodiment in FIG. 5, on the extreme lateral ends, namely the ends closest to the fuselage portion 2.

In one particular embodiment, shown in FIG. 4, all the crossmembers 6 of the floor 3 are joined to the frames 4 of the fuselage portion 2, via two elastic link rods 13 and 14. Preferably, all of the elastic link rods 13 and 14 are identical, meaning that they all have the same dimensions and the same mechanical properties, in particular the same elastic properties.

Furthermore, in other embodiments (not shown), in a variant of this particular embodiment, only some crossmembers 6 of the floor 3 are joined to the fuselage portion 2 by elastic link rods.

In a first embodiment, shown in FIG. 1 to FIG. 4, the elastic link rods 13 and 14 are arranged between the floor 3 and the fuselage portion 2 in an oblique (or inclined) manner with respect to the vertical axis Z-Z and with respect to the transverse axis Y-Y.

More specifically, in this first embodiment, the elastic link rod 13 is arranged such that its end 15 that is joined to the floor 3 is situated towards the inside (along the transverse axis Y-Y) and towards the top (along the vertical axis Z-Z) compared with its end 16 that is joined to the fuselage portion 2.

Similarly, the elastic link rod 14 is arranged such that its end 17 that is joined to the floor 3 is situated towards the inside (along the transverse axis Y-Y) and towards the top (along the vertical axis Z-Z) compared with its end 18 that is joined to the fuselage portion 2.

In this first embodiment, the elastic link rods 13 and 14 are joined to the floor 3 below the crossmember 6 (the side of the crossmember 6 oriented towards the bottom of the aircraft part 1). They are fixed to the crossmember 6. According to one embodiment, they are fixed to the transverse ends of the crossmember 6. According to the embodiment illustrated, they are fixed to the crossmember 6 in the vicinity of joints 21 and 22 between the crossmember 6 and the two transversely outermost spars 7, at each transverse end (along the transverse axis Y-Y) of the floor 3. In particular, the end 15 of the elastic link rod 13 is fixed in the vicinity of the joint 21 and the end 17 of the elastic link rod 14 is fixed in the vicinity of the joint 22.

Furthermore, in a second embodiment, shown in FIG. 5, the elastic link rods 13 and 14 are oriented in an oblique (or inclined) manner with respect to the vertical axis Z-Z and with respect to the transverse axis Y-Y such that their end that is joined to the floor 3 is situated towards the outside of the aircraft part 1, and their end that is joined to the fuselage 2 is situated towards the inside of the aircraft part 1.

More specifically, in this second embodiment, the elastic link rod 13 is arranged such that its end 15 that is joined to the floor 3 is situated towards the outside (along the transverse axis Y-Y) and towards the top (along the vertical axis Z-Z) compared with its end 16 that is joined to the fuselage portion 2.

Similarly, the elastic link rod 14 is arranged such that its end 17 that is joined to the floor 3 is situated towards the outside (along the transverse axis Y-Y) and towards the top (along the vertical axis Z-Z) compared with its end 18 that is joined to the fuselage portion.

In this second particular embodiment, the elastic link rods 13 and 14 are joined to the floor 3 below the crossmember 6 (the side of the crossmember 6 oriented towards the bottom of the aircraft part 1). According to one embodiment, they are joined to the transverse ends of the crossmember. According to the embodiment illustrated, the end 15 of the elastic link rod 13 is fixed to the transverse end 25 of the crossmember 6 and the end 17 of the elastic link rod 14 is fixed to the transverse end 26 of the crossmember 6.

Moreover, the elastic link rods 13 and 14 are joined to the fuselage portion 2 at the transverse ends of the wall 5, for example the roof of the landing gear or the upper skin panel of the central wing box. In particular, the end 16 of the elastic link rod 13 is fixed to a beam 27 of the central box 5 and the end 18 of the elastic link rod 14 is fixed to a beam 28 of the central box 5. In the embodiment illustrated, these are beams 27, 28 that are situated at the most extreme level compared with the others, transversely.

Of course, the arrangements of the elastic link rods 13 and 14, as described above, are not limiting. Specifically, the elastic link rods 13 and 14 may be arranged between the floor 3 and the fuselage portion 2 in various ways.

Furthermore, the elastic link rods 13 and 14 may correspond to any type of conventional link rod for obtaining a sufficient stiffness and travel corresponding to the desired values.

In one particular embodiment, they may correspond to an elliptical-spring rod, to a spring-washer rod or to a piston rod. More generally, they may correspond to any other type of link rod having the abovementioned stiffness and elongation features, that is to say affording a relatively low calibrated stiffness and a relatively long elongation (or travel).

Furthermore, in one particular embodiment, shown in FIG. 5, the aircraft part 1 has conventional dampers 30, for example hydraulic dampers, coupled to at least some of the elastic link rods 13 and 14, and preferably to all of the elastic link rods 13 and 14. A damper 30 may be coupled to the elastic link rod 13, 14 in parallel or in series. Moreover, it may be directly integrated into the latter (as shown schematically in FIG. 5) or not.

By virtue of the dampers 30, it is possible to eliminate or at the very least to weaken an undesirable dynamic response or resonance, in particular of the floor 3 and of its cargo 9.

The above-described aircraft part 1 is intended to be part of an aircraft AC as shown by way of illustration in FIG. 6. Preferably, the aircraft part 1 corresponds to a central part of the aircraft AC, as shown in FIG. 6. This central part may, in particular, correspond to the part situated along the longitudinal axis X-X at the central wing box and the landing gear.

The aircraft part 1 comprising a fuselage portion 2 and a floor 3 joined to the fuselage portion 2 via elastic link rods 13 and 14, as described above, has numerous advantages. In particular:

it allows, at a lower cost and with a lower mass, a suitable elastic connection between the floor 3 and the fuselage portion 2;

it makes it possible to avoid any deformation incompatibility between the floor 3, which is rigid, and the fuselage portion 2, in particular in zones in which the fuselage portion 2 is subjected to significant deformations;

it makes it possible to transmit loads, in particular inertial loads, between the floor 3 and the fuselage portion 2; and it avoids the need to provide a complex rigid structure, which is expensive and heavy, between the floor 3 and the fuselage portion 2.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft part comprising:
at least one fuselage portion and a floor joined to said fuselage portion, wherein at least a part of said floor is joined to said fuselage portion via at least two elastic link rods, wherein said aircraft part has a longitudinal axis and a vertical axis which is orthogonal to the longitudinal axis, wherein said floor has crossmembers which are supported on spars, such that said spars are beam elements which are arranged parallel to the longitudinal axis, and joints are disposed between said spars and said crossmembers,
each of the elastic link rods being provided with a first end that is fixed to the floor and with a second end that fixed to a beam of a central box of the fuselage portion, and
said elastic link rods being configured to exhibit a stiffness that allows the elastic link rods both to transmit loads between the floor and the fuselage portion and to absorb displacements brought about by deformations of the fuselage portion, so that the deformations of said fuselage portion are not transferred to said floor,
wherein the fuselage part is disposed below the floor along the vertical axis, and
wherein the second end of at least one of said elastic link rods is fixed to the fuselage portion at a rigid point of said fuselage portion, wherein said rigid point is an area of said fuselage portion which exhibits a minimum displacement relative to a remainder of said fuselage portion when a particular loading condition is applied to said fuselage portion which causes deformation of said fuselage portion, wherein said rigid point where the second end of said at least one of said elastic link rods is fixed to the beam of the central box of the fuselage portion is positioned below a level of a top of the spars along the vertical axis and above a level of an upper skin panel of the central box along the vertical axis.

2. The aircraft part according to claim 1,
wherein said floor comprises at least one crossmember, and
wherein said at least one crossmember is joined to said fuselage portion via at least one of the elastic link rods.

3. The aircraft part according to claim 2, wherein said at least one crossmember is joined on each side to said fuselage portion via at least one of the elastic link rods.

4. The aircraft part according to claim 1, wherein at least one of said at least two said elastic link rods is arranged such that the first end is situated farther from the vertical axis compared with the second end.

5. The aircraft part according to claim 1, wherein at least one of said elastic link rods comprises one of the following link rods: an elliptical-spring rod, a spring-washer rod, a piston rod.

6. The aircraft part according to claim 1, further comprising at least one damper coupled to at least one of said elastic link rods.

7. An aircraft comprising an aircraft part according to claim 1.

8. The aircraft according to claim 7, wherein the aircraft comprises a cargo airplane.

9. An aircraft part comprising:
at least one fuselage portion and a floor joined to said fuselage portion, wherein at least a part of said floor is joined to said fuselage portion via at least two elastic link rods, wherein said floor has crossmembers which are supported on spars, such that said spars are beam elements which are arranged parallel to the longitudinal axis, and joints are disposed between said spars and said crossmembers,
each of the elastic link rods being provided with a first end that is configured to be fixed to the floor and with a second end that is configured to be fixed to a beam of a central box of the fuselage portion,
said elastic link rods being configured to exhibit a stiffness that allows the elastic link rods to both transmit loads between the floor and the fuselage portion and to absorb displacements brought about by deformations of the fuselage portion, so that the deformations of said fuselage portion are not transferred to said floor,
wherein the fuselage part is disposed below the floor along the vertical axis, and wherein at least one of said at least two said elastic link rods is arranged such that the first end is situated farther from the vertical axis compared with the second end, and
wherein the second end at least one of said elastic link rods is fixed to the fuselage portion at a rigid point of said fuselage portion, wherein said rigid point is an area of said fuselage portion which exhibits a minimum displacement relative to a remainder of said fuselage portion when a particular loading condition is applied to said fuselage portion which causes deformation of said fuselage portion, wherein said rigid point where the second end of said at least one of said elastic link rods is fixed to the beam of the central box of the fuselage portion is positioned below a level of a top of the spars along the vertical axis and above a level of an upper skin panel of the central box along the vertical axis.

10. The aircraft part according to claim 9,
wherein said floor comprises at least one crossmember, and
wherein said at least one crossmember is joined to said fuselage portion via at least one of the elastic link rods.

11. The aircraft part according to claim 10, wherein said at least crossmember is joined on each side to said fuselage portion via at least one of the elastic link rods.

12. The aircraft part according to claim 9, wherein at least one of said at least two said elastic link rods is arranged such that the first end is situated closer to the vertical axis compared with the second end.

13. The aircraft part according to claim 9, wherein at least one of said elastic link rods comprises one of the following link rods: an elliptical-spring rod, a spring-washer rod, a piston rod.

14. The aircraft part according to claim 9, further comprising at least one damper coupled to at least one of said elastic link rods.

15. An aircraft comprising an aircraft part according to claim 9.

16. The aircraft according to claim 15, wherein the aircraft comprises a cargo airplane.

17. An aircraft part comprising:
at least one fuselage portion and a floor joined to said fuselage portion, wherein at least a part of said floor is joined to said fuselage portion via at least two elastic link rods, wherein said aircraft part has a longitudinal axis and a vertical axis which is orthogonal to the longitudinal axis, wherein said floor has crossmembers which are supported on spars, such that said spars are beam elements which are arranged parallel to the longitudinal axis, and joints are disposed between said spars and said crossmembers,
each of the elastic link rods being provided with a first end that is fixed to the floor and with a second end that is fixed to a beam of a central box of the fuselage portion,
said elastic link rods being configured to exhibit a stiffness that allows the elastic link rods both to transmit loads between the floor and the fuselage portion and to absorb displacements brought about by deformations of the fuselage portion, so that the deformations of said fuselage portion are not transferred to said floor, and
at least one damper coupled to at least one of said elastic link rods, such that said at least one damper is fixed to said floor and said first end,
wherein the fuselage part is disposed below the floor along the vertical axis, and wherein at least one of said at least two said elastic link rods is arranged such that the first end is situated closer to the vertical axis compared with the second end, and wherein the first end is displaced from a terminal edge of the floor farthest from the vertical axis, and
wherein at least one of said elastic link rods is fixed to the fuselage portion at a rigid point of said fuselage portion, wherein said rigid point is an area of said fuselage portion which exhibits a minimum displacement relative to a remainder of said fuselage portion when a particular loading condition is applied to said fuselage portion which causes deformation of said fuselage portion, wherein said rigid point where the second end of said at least one of said elastic link rods is fixed to the beam of the central box of the fuselage portion is positioned below a level of a top of the spars along the vertical axis and above a level of an upper skin panel of the central box along the vertical axis.

* * * * *